(12) United States Patent
Dementyev et al.

(10) Patent No.: US 11,637,519 B2
(45) Date of Patent: Apr. 25, 2023

(54) LINEAR RESONANT ACTUATOR AS A TAP, TOUCH AND PRESSURE SENSOR USING BACK EMF

(71) Applicant: Google LLC, Mountain View, CA (US)

(72) Inventors: Artem Dementyev, Boston, MA (US); Richard Francis Lyon, Los Altos, CA (US); Alex Olwal, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/733,181

(22) Filed: Apr. 29, 2022

(65) Prior Publication Data

US 2022/0263447 A1 Aug. 18, 2022

Related U.S. Application Data

(63) Continuation of application No. 17/136,811, filed on Dec. 29, 2020, now Pat. No. 11,336,216.

(51) Int. Cl.
*H02P 25/034* (2016.01)
(52) U.S. Cl.
CPC .................. *H02P 25/034* (2016.02)
(58) Field of Classification Search
CPC ..................................... H02P 25/034
See application file for complete search history.

(56) References Cited

U.S. PATENT DOCUMENTS

| | | |
|---|---|---|
| 9,513,709 B2 | 12/2016 | Gregorio et al. |
| 11,336,216 B1 | 5/2022 | Dementyev et al. |
| 2011/0102162 A1 | 5/2011 | Gregorio et al. |
| 2012/0229264 A1 | 9/2012 | Company Bosch et al. |
| 2013/0053661 A1* | 2/2013 | Alberth ............... A61B 5/1455 600/390 |
| 2016/0141985 A1 | 5/2016 | Viscardi et al. |
| 2017/0086742 A1* | 3/2017 | Harrison-Noonan ....... A61B 5/6843 |
| 2018/0059793 A1 | 3/2018 | Hajati |
| 2019/0142341 A1* | 5/2019 | Harrison-Noonan ....... A61B 5/681 73/1.79 |

(Continued)

OTHER PUBLICATIONS

Liu et al., VibSense: Sensing Touches on Ubiquitous Surfaces through Vibration, Jul. 3, 2017, https://ieeexplore.ieee.org/document/7964907, 9 pages.

(Continued)

*Primary Examiner* — Zoheb S Imtiaz
(74) *Attorney, Agent, or Firm* — Dority & Manning, P.A.

(57) ABSTRACT

The present disclosure provides systems and methods for using a linear resonant actuator ("LRA") to determine a type of contact between a device and its surroundings. The LRA may be coupled to an amplifier by one or more switches. The audio amplifier may receive a signal from a microcontroller and transmit the signal the LRA when the switches are closed. When the switches are in an open position, the LRA may be actively sensing for the type of contact. The back EMF may be measured when the switches are open. The measured back EMF waveform may be used to determine the type of contact. When the signal is not being transmitted, the LRA may be passively sensing to determine whether the device was tapped.

20 Claims, 8 Drawing Sheets

(56) References Cited

U.S. PATENT DOCUMENTS

2019/0335087 A1    10/2019  Tabuchi

OTHER PUBLICATIONS

Cambio, Ultra-Low Latency Control of Large Vibrotactile Arrays for Haptic Interactions, Apr. 2020, https://scholarship.rice.edu/bitstream/handle/1911/108365/CAMBIO-DOCUMENT-2020.pdf?sequence=1&isAllowed=y, 68 pages.

Artem Dementyev, Alex Olwal and Richard F. Lyon, Haptics with Input: Back-EMF in Linear Resonant Actuators to Enable Touch, Pressure and Environmental Awareness, Oct. 20-23, 2020, 10 pages.

"Non-Final Office Action", U.S. Appl. No. 17/136,811, dated Sep. 27, 2021, 7 pages.

"Notice of Allowance", U.S. Appl. No. 17/136,811, dated Jan. 20, 2022, 8 pages.

\* cited by examiner

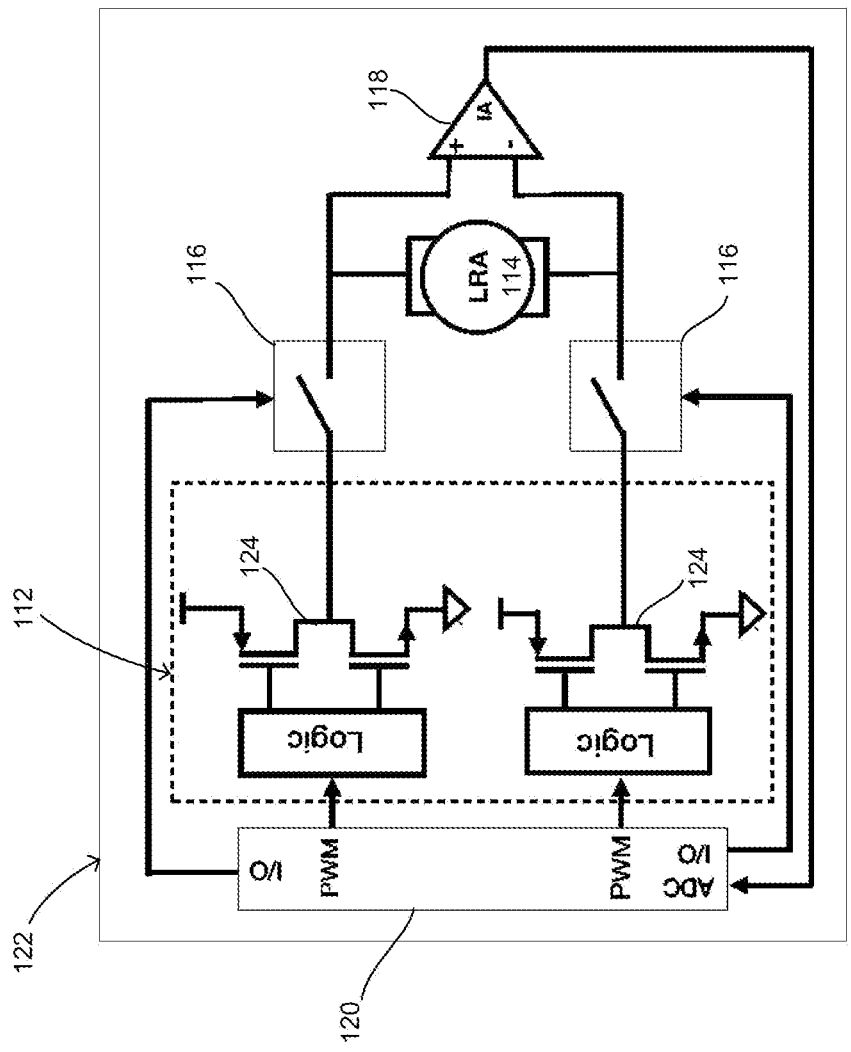

LINEAR RESONANT ACTUATOR AS A TAP, TOUCH AND PRESSURE SENSOR USING BACK EMF

CROSS-REFERENCE TO RELATED APPLICATIONS

This application is a continuation of U.S. application Ser. No. 17/136,811, filed on Dec. 29, 2020, the disclosure of which is incorporated herein by reference.

BACKGROUND

Mobile and wearable devices, such as smart phones and smart watches, include a linear resonant actuator ("LRA") to provide haptic feedback to a user. The LRA is a linear electric motor that uses resonance to provide haptic feedback. For example, the LRA may produce a vibration when the device is touched by a user. However, a separate component or sensor is used to determine whether the device was touched by the user and/or the pressure of the touch applied to the device by the user. This may increase the costs and complexity of manufacturing the device.

BRIEF SUMMARY

The present disclosure generally relates to using an LRA to determine a type of contact with the device. For example, the type of contact may be a user holding the device, the device resting on a material surface, the device being worn by a user, or a touch. The types of contact between the device and its surroundings may have different characteristics, such as a speed of contact with the device, a pressure of contact with the device, a duration of contact with the device, a material in contact with the device, or a surface area in contact with the device. The LRA may be coupled to an audio amplifier by one or more switches. The audio amplifier may receive a signal from a microcontroller. The audio amplifier may transmit the signal to the LRA when the switches are in a closed position. When the switches are in an open position, a back electromotive force ("EMF") of the LRA may be measured or determined. For example, an instrumental amplifier may be used to determine, or capture, the back EMF. The back EMF may be measured in volts ("V").

Depending on the amount of pressure of the touch, and/or what is touching the device will determine how much dampening there is to the LRA and, therefore, how much the back EMF drops. For example, the human body is a soft viscoelastic material that can absorb energy depending on the contact force. The human body may absorb some of the energy from the oscillation of the mass of the LRA and, therefore, dampen the oscillation. Dampening the oscillation of the mass of the LRA may reduce the amount of back EMF.

The determined back EMF may be compared to a previously determined back EMF, such as the back EMF detected during a previous reading. For example, the determined back EMF may be compared to a back EMF that was determined 10, 12, 15, 25, etc. readings ago. If the difference between the determined back EMF and the back EMF from any number of readings ago is higher than a threshold, it may be determined that the device was touched. In some examples, determining the pressure of a touch on the device may be determined by comparing the determined back EMF to a baseline threshold. The pressure may be the difference between the determined back EMF and the baseline threshold.

One aspect of the disclosure includes a device comprising a linear resonant actuator ("LRA") and one or more processors in communication with the LRA. The one or more processors may be configured to measure a back electromotive force ("EMF") of the LRA and determine, based on the measured back EMF, a type of contact between the device and its surroundings. The one or more processors may be further configured to measure a damping of an internally moving mass. The LRA may include the internally moving mass, a magnet coupled to the internally moving mass, and a spring, wherein the internally moving mass and the magnet are coupled to the spring. The device may further comprise a comparator configured to transmit a trigger based on the measured back EMF.

The type of contact may include a user holding the device, the device resting on a material surface, the device being worn by a user, or a touch. The type of contact between the device and its surroundings may be based on at least one of a speed of contact with the device, a pressure of contact with the device, a duration of contact with the device, a material in contact with the device, or a surface area in contact with the device. When determining the type of contact is the touch, the one or more processors may be further configured to compare the measured back EMF to a previously measured back EMF. When determining that the type of contact is the touch, the difference between the determined back EMF and the previously measured back EMF may be greater than a predetermined threshold. When determining the pressure of contact with the device, the one or more processors may be further configured to determine a difference between the measured back EMF and a baseline threshold.

The device may further comprise an amplifier and one or more switches coupling the amplifier and the LRA. The one or more processors may be further configured to transmit a signal to the amplifier and switch the one or more switches from a closed position to an open position or from the open position to the closed position, wherein when the one or more switches are in the open position the signal is not transmitted from the amplifier to the LRA. Determining the back EMF of the LRA may further comprise determining the back EMF when the one or more switches are in the open position. When the one or more switches are in the closed position, the LRA may produce oscillating back EMF voltage.

Another aspect of the disclosure includes a method, comprising measuring, by one or more processors, a back electromotive force ("EMF") of a linear resonant actuator ("LRA") and determining, by the one or more processors based on the measured back EMF, a type of contact between a device and its surroundings.

Yet another aspect of the disclosure includes a device comprising a linear resonant actuator ("LRA") including a mass, a magnet, and a spring, a comparator, and one or more processors in communication with the LRA and the comparator. The one or more processors may be configured to detect a disturbance of the mass and the magnet on the spring and measure a back electromotive force ("EMF") based on the detected disturbance, wherein the comparator is configured to transmit a trigger based on the measured back EMF. The trigger may cause the device to transition from a sleep state to an awake state. The disturbance may be an external force exerted on the device.

BRIEF DESCRIPTION OF THE DRAWINGS

FIG. 1A is a functional block diagram of a device in accordance with aspects of the disclosure.

FIG. 1B is a schematic drawing of a back EMF measurement circuit of FIG. 1A in accordance with aspects of the disclosure.

DETAILED DESCRIPTION

Figure 1C:
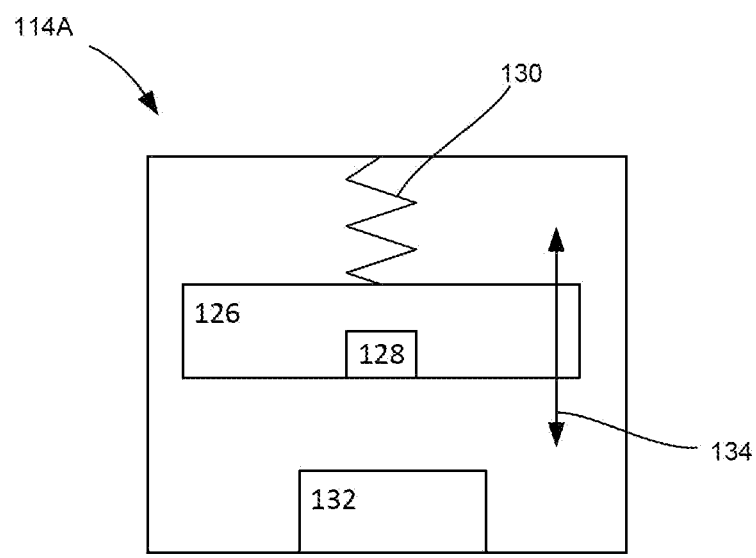
FIG. 1C is a mechanical representation of a LRA in accordance with aspects of the disclosure.

A device, such as a mobile or wearable device may use a linear resonant actuator ("LRA") that is already within the device to determine a type of contact between the device and its surroundings. Wearable and mobile devices may include, for example, smartwatches, audio visual and/or virtual reality headsets, smart phones, tablets, etc.

The type of contact may include a user holding the device, the device resting on a material surface, the device being worn by a user, or a fingertip touch. The type of contact may be based on at least one of a speed of contact with the device, a pressure of contact with the device, a duration of contact with the device, a material in contact with the device, or a surface area in contact with the device. In some examples, the fingertip touch may be an instantaneous touch, such as a tap of the fingertip on the device, or an extended touch, such as pressing a button on a device. An instantaneous touch or tap may have a higher velocity than an extended touch. In some examples, the instantaneous touch may have a shorter duration than an extended touch. According to some examples, the fingertip touch may have a shorter duration as compared to a user holding the device or the device resting on the material surface. However, a fingertip touch is only one example of a type of touch and is not intended to be limiting. The pressure of contact with the device may remain constant when the device is being worn by a user, such as when a user is wearing a smartwatch, whereas the pressure of contact with the device may vary as the device is being held by a user.

The LRA within the device may include a mass attached to a spring such that the mass oscillates along an axis in line with a voice coil, a magnet coupled to the mass, and a voice coil that provides a voltage thereby causing the mass and magnet to oscillate. The voltage provided by the voice coil may cause the magnet coupled to the mass to oscillate. The motion of the oscillating mass may produce a counter-electromotive force, or back EMF.

The resonant frequency of the LRA may be determined by the spring constant and the weight of the oscillating mass. According to some examples, the LRA may have a resonant frequency between 150-200 Hz, as human skin perception is sensitive in that range. A driving electrical alternating current ("AC") signal may be supplied at the resonant frequency. The AC signal may cause the mass to oscillate at the resonant frequency. In some examples, the LRA may be driven at lower frequencies to avoid resonance, minimizing perception and noise. For example, the LRA may be driven at approximately 50 Hz. However, in some examples, the LRA may be driven at 53 Hz, 60 Hz, 42 Hz, etc. Therefore, driving the LRA at 50 Hz is only one example and is not intended to be limiting.

An electrical equivalent of an LRA may include an inductor, a resistor, and an alternating current ("AC") driver. For example, the AC driver, inductor, and resistor may be connected in series as part of a circuit. The LRA's electrical model may act as a low pass filter, thus can be driven by high frequency driver, such as 25 kHz H-class amplifier According to some examples, the LRA may be coupled to an amplifier by one or more switches. A microcontroller may provide an input, such as a signal, to the amplifier. When the switches are in a closed position, the signal may be transmitted to the LRA which may cause the LRA to oscillate or vibrate at a certain frequency. When the switches are in an open position, the signal may not be transmitted to the LRA but the LRA may still oscillate or vibrate due to the momentum of the mass and magnet.

When the switches are in an open position a back electromotive force ("EMF") may be determined. In some examples, an instrumentation amplifier may be coupled to the LRA. The instrumentation amplifier may be used to determine, or capture, the back EMF when the switches are in the open position. A drop in back EMF may depend on the amount of touch, the pressure of the touch, and what is touching the device. According to some examples, when the device is touched, the oscillation or vibration of the LRA may be dampened. In examples where a human touches the device, the human body is able to absorb energy based on the contact force. The human body may, therefore, absorb some of the energy from the oscillation of the mass of the LRA which may slow, or dampen, the oscillation of the mass of the LRA. As the oscillation of the mass of the LRA slows, the value of the back EMF may become lower.

To determine whether the device is being touched, the determined back EMF when the switches are in the open position may be compared to a previously determined back EMF. A previously determined back EMF may be a back EMF captured 2, 5, 7, 10, 12, etc. readings or cycles ago. A difference between the determined back EMF and a previously determined back EMF may be compared to a threshold. In some examples, where the difference is higher than the threshold it may be determined that the device was being touched.

To determine the pressure of a touch on the device, the determined back EMF may be compared to a baseline threshold. For example, once the device determines that the device has been touched, the determined back EMF may be subtracted from the baseline threshold. The difference between the determined back EMF and the baseline threshold may be the amount of pressure applied to the device.

Using the LRA, which is already in the device, to determine whether the device was touched, with how much pressure was the device touched, and what surface is touching the device may provide for an increased user experience. This may provide the device greater sensing capabilities to the LRA without requiring additional sensors or hardware. In some examples, using the LRA instead of other sensors and components within the device may decrease power consumption. A decrease in power consumption may increase the length of time the user may use the device before having to recharge the device. According to some examples, by determining whether the device is in contact with the human body or a hard surface, such as a table top, the device may further conserve battery life by not turning the screen on in response to determining that it is in contact with a hard surface.

Further, by using the LRA to make determinations about the type of contact between the device and its surroundings, the costs and complexity of manufacturing the device may decrease. Using the LRA to determine these types of contact may obviate the need for other components within the device. The LRA may already be within most mobile and wearable devices to provide haptic feedback and, therefore, additional components may not be required during manufacturing.

FIG. 1A illustrates a device 102 in which the features described above and herein may be implemented. In this example, device 102, may contain one or more processors 104, memory 106, instructions 108, data 110, an amplifier 112, a linear resonant actuator ("LRA") 114, one or more switches 116, an instrumentation amplifier 118, and a microcontroller 120.

The one or more processors 104 may be any conventional processors, such as commercially available microprocessors. Alternatively, the one or more processors may be a dedicated device such as an application specific integrated circuit (ASIC) or other hardware-based processor. Although FIG. 1A functionally illustrates the processor, memory, and other elements of wearable device 102 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of device 102. Accordingly, references to a processor or computing device will be understood to include references to a collection of processors or computing devices or memories that may or may not operate in parallel.

Memory 106 may store information that is accessible by the processors, including instructions 108 that may be executed by the processors 104, and data 110. The memory 106 may be a type of memory operative to store information accessible by the processors 104, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 108 and data 110 are stored on different types of media.

Memory 106 may be retrieved, stored or modified by processors 104 in accordance with the instructions 108. For instance, although the present disclosure is not limited by a particular data structure, the data 110 may be stored in computer registers, in a relational database as a table having a plurality of different fields and records, XML documents, or flat files. The data 110 may also be formatted in a computer-readable format such as, but not limited to, binary values, ASCII or Unicode. By further way of example only, the data 110 may be stored as bitmaps composed of pixels that are stored in compressed or uncompressed, or various image formats (e.g., JPEG), vector-based formats (e.g., SVG) or computer instructions for drawing graphics. Moreover, the data 110 may comprise information sufficient to identify the relevant information, such as numbers, descriptive text, proprietary codes, pointers, references to data stored in other memories (including other network locations) or information that is used by a function to calculate the relevant data.

The instructions 108 can be any set of instructions to be executed directly, such as machine code, or indirectly, such as scripts, by the processor 104. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Device 102 may include a back EMF measurement circuit 122. The back EMF measurement circuit 122 may include amplifier 112, linear resonant actuator ("LRA") 114, one or more switches 116, instrumentation or differential amplifier 118, and microcontroller 120. While the components are each represented in FIG. 1A, FIG. 1B illustrates the schematic of the back EMF measurement circuit 122.

The amplifier 112 may be used for input and output of a signal to LRA 114. According to some examples, amplifier 112 may be an audio amplifier. Amplifier 112 may receive a signal from microcontroller 120. The amplifier 112 may receive the signal as input and may output the signal to the LRA 114. The output of amplifier 112 may be in an analog waveform. The amplifier 112 may include logic and one or more H-bridges 124. The H-bridges 124 may be configured to reverse current and enable electric braking of LRA 114. In some examples, the H-bridge 124 may output a signal that approximates analog waveforms.

As shown in FIG. 1B, amplifier 112 may be coupled to the LRA 114 via one or more switches 116. According to some examples, switches 116 may be analog switches. When switches 116 are in the closed position, LRA 114 receives the signal transmitted by amplifier 112. The signal transmitted by amplifier 112 to the LRA 114 may be the signal amplifier 112 received from microcontroller 114. The signal may cause the LRA 114 to oscillate. When switches 116 are in the open position, LRA 114 does not receive the signal transmitted from the amplifier 112. The back EMF may be determined when the switches 116 are in the open position.

The LRA 114 may operate as a linear electric motor and may be driven by alternating current. The LRA 114 may operate at a resonance between 150 Hz and 250 Hz. The frequency range of 150 Hz and 250 Hz may correspond to the sensitivity of the tactile receptors of the human body. The LRA 114 may be configured to be a resistor-inductor ("RL") low-pass filter. For example, LRA 114 may convert the signal into an analog waveform.

As shown in FIG. 1C, the LRA 114A may contain a mass 126 attached to a spring 130. A magnet 128 may be coupled to mass 126. The mass 126 and magnet 128 may move along an axis 134. As the mass 126 and magnet 128 oscillates, the mass 126 and magnet 128 may move closer and/or further away from coil 132. Coil 132 may be a voice coil. As the mass 128 and magnet 128 oscillates relative to coil 132, the magnet 128 may create magnetic flux. The rate of change of the magnetic flux created by the oscillating magnet 128 may be proportional to the back EMF. For example, as the device is touched, held, worn by a user, or resting on a material surface, the oscillation of the mass may dampen based on how much vibrational energy is absorbed by the object in contact with the device. The dampening of the moving mass may be proportional to the back EMF.

Figure 1D:
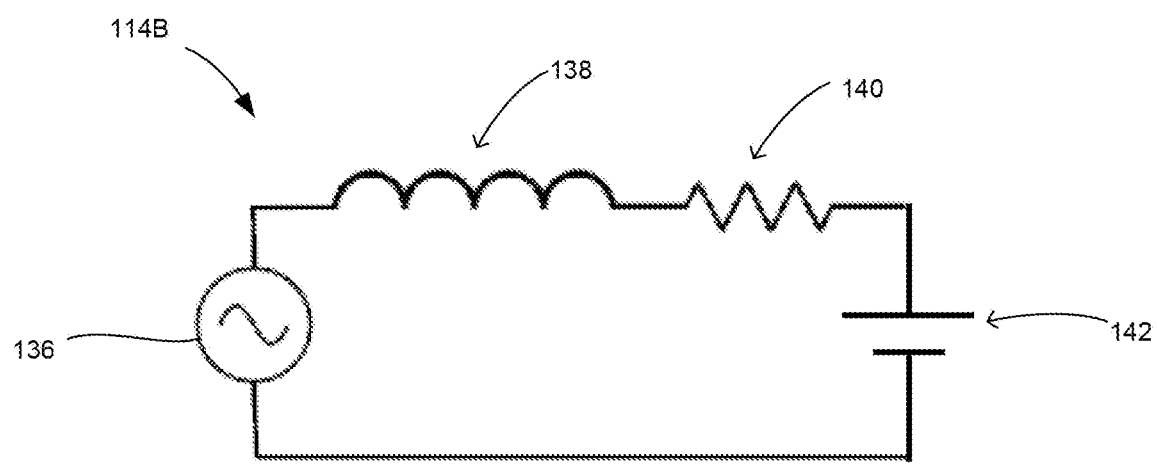
FIG. 1D is a schematic drawing of a LRA in accordance with aspects of the disclosure.

As shown in FIG. 1D, the LRA 114B may be modeled as an electrical circuit. The circuit may include an AC driver 136, inductor 138, resistor 140, and a back EMF measurement location 142.

When the switches 116 are in the open position, such that LRA 114 does not receive the signal, an instrumentation amplifier 118 may be used to determine the back EMF. The back EMF may be proportional to the rate of change of the velocity of the mass of the LRA 114. The back EMF may be measured from the floating voltage between the two LRA leads. For example, when switches 116 are in the open position, the mass in the LRA 114 may still oscillate. The oscillation of the mass within LRA 114 may produce oscillating back EMF voltage.

Instrumentation or a differential amplifier 118 may reduce the common-mode noise, such as 60 Hz power lines, which may overwhelm the signal originating from microcontroller 120. Common-mode noise may be noise from outside the device. For example, the noise may be from other devices or electrical circuits near the device.

Microcontroller 120 may digitize and process signal. The signal may be, for example, a pulse width modulation ("PWM"). The PWM may have a waveform configured to drive LRA 114. The PWM shape may be configured to optimize the capture of the back-EMF signal. Additional details pertaining to the PWM will be discussed herein with respect to FIGS. 2 and 3.

As shown in FIG. 1B, microcontroller 120 may transmit, as output, the signal to amplifier 112. Microcontroller 120 may receive the back EMF, as input, from instrumentation amplifier 118. The microcontroller 120 may transmit the back EMF to the one or more processors 104. The one or more processors 104, based on the determined back EMF, may determine whether the device 102 was touched, a pressure of the touch, and what is touching device 102.

Figure 2:
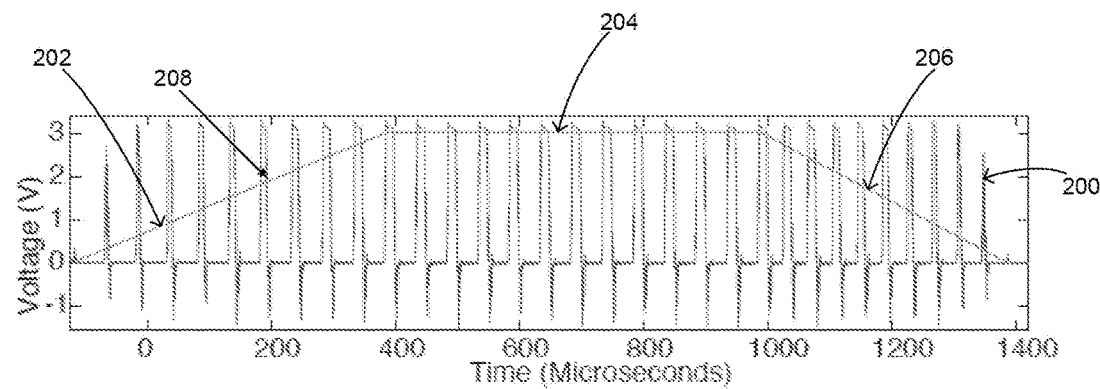
FIG. 2 is an example signal according to aspects of the disclosure.

FIG. 2 illustrates an example signal transmitted to drive the LRA during active sensing. Active sensing may be used when determining whether the device was touched and/or the pressure at which the device was touched. Touching or making contact with the LRA while the mass in the LRA oscillates may change the velocity at which the mass oscillates. For example, when contact is made with the LRA, the vibrational energy of the LRA may be dissipated into the object in contact with the LRA. In some examples, different amounts of vibrational energy may be absorbed by the object in contact with the LRA based on the amount of pressure applied to the LRA. The slowing, or dampening, of the oscillation of the LRA may be determined based on the back EMF output by the LRA.

The signal transmitted to drive the LRA may be a PWM waveform 200. The shape of the waveform may have three equal stages, as indicated by the filtered PWM output 208. For example, there may be a ramp up stage 202, flat stage 204, and ramp down stage 206. Having three equal stages may cause the mass inside the LRA to move more smoothly and, therefore, decrease the audible crackling noise. The waveform 200 may be optimized for sensing. For example, each pulse may be 20 kHz with a width of 1 us. However, the pulse may be 10 kz, 18 kHz, 25 kHz, etc. and the width may be 0.7 us, 0.87 us, 1.2 us, etc. Therefore, the pulse of 20 kHz and width of 1 us is merely one example and is not intended to be limiting. For example, the pulse and the width may be determined based on the LRA on the device.

Figure 3:
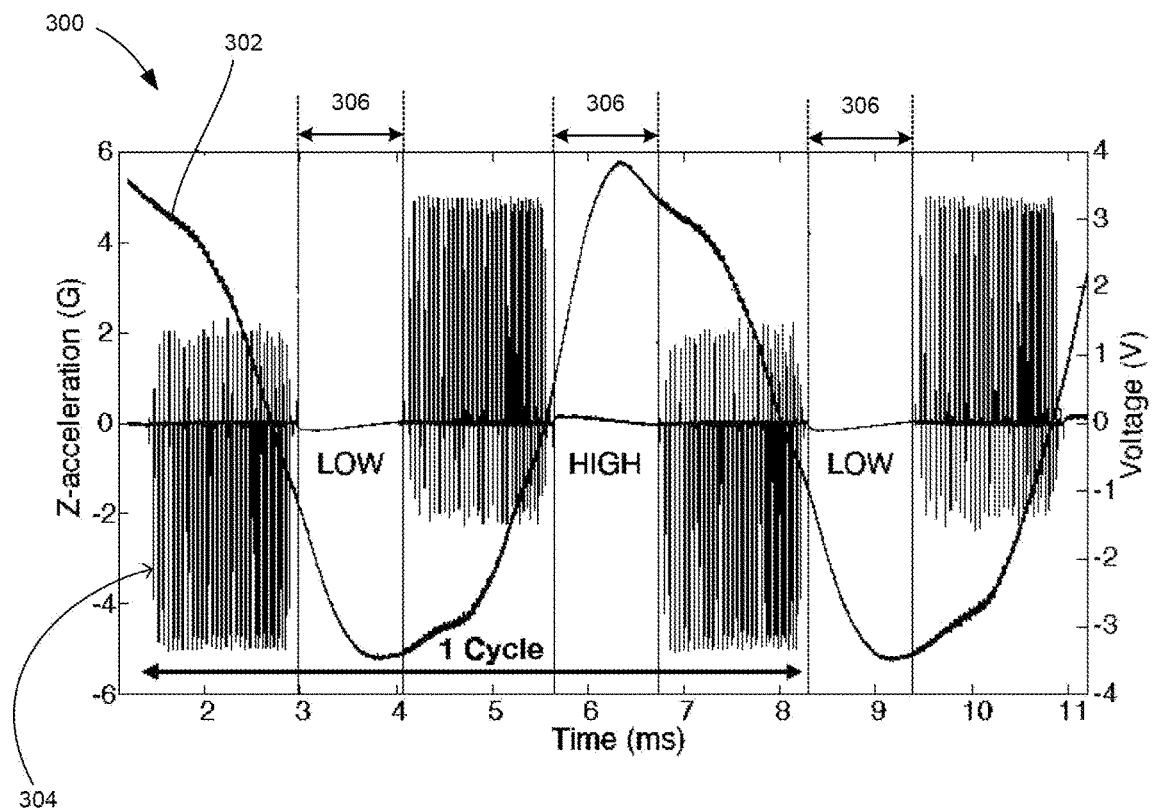
FIG. 3 is a graphical representation of the acceleration and back EMF of the LRA in accordance with aspects of the disclosure.

FIG. 3 illustrates a graph of the acceleration of the LRA superimposed on the output of the back EMF measurement circuit. For example, the measured acceleration 302 of the LRA may be substantially similar to a sine wave. This may represent the periodic motion of the LRA as it oscillates. The output 304 of the back EMF measurement circuit may be measured after negative and positive drive half-cycles. The negative and positive drive half-cycles may be referred to as low and high, as shown on graph 300.

According to some examples, the back EMF may be measured during time 306. Time 306 may be when the one or more switches are changed to the open position such that the LRA does not receive the signal transmitted by the microcontroller and/or amplifier. As shown in graph 300, even when the LRA is not receiving the signal during time 306, the LRA may continue to accelerate and, therefore, oscillate. By measuring the back EMF during time 306, external forces applied to the device, and, therefore, the LRA may be measured. The external force may be, for example, a user's touch, the device being placed on a surface, etc. The back EMF may be a voltage measurement when the coil, or spring, of the LRA is moving relative to the magnet attached to the mass.

Figure 4:
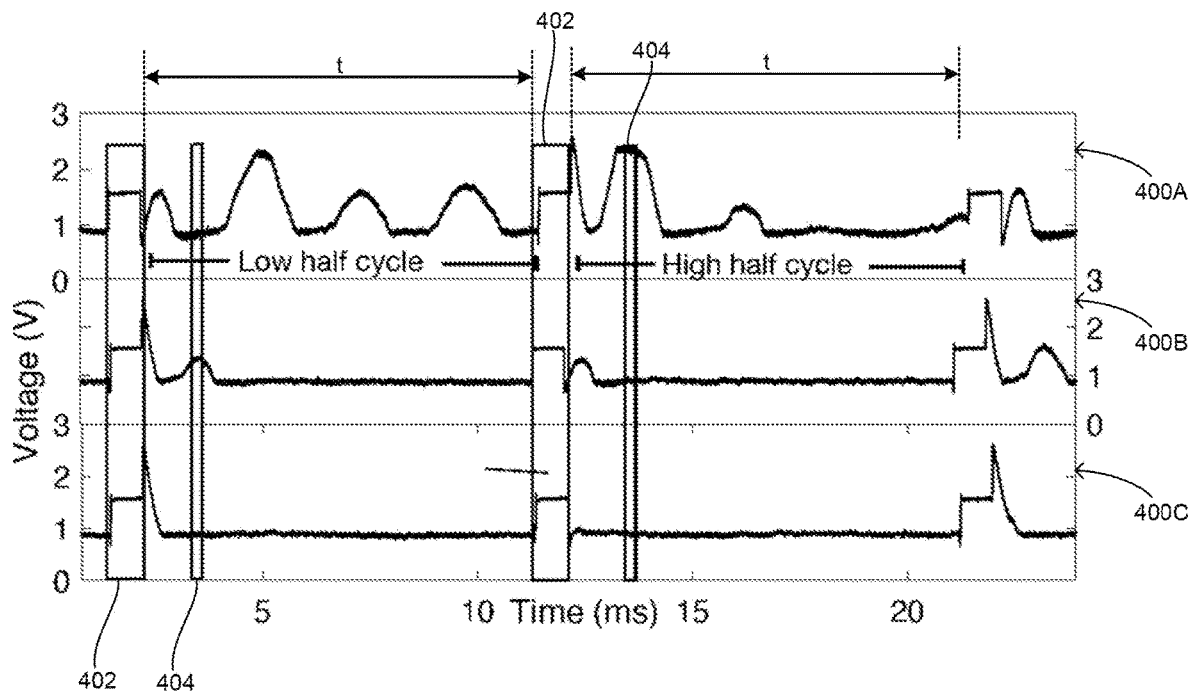
FIG. 4 is a graphical representation of back EMF when a device is being touched in accordance with aspects of the disclosure.

FIG. 4 illustrates example outputs of back EMF measurement circuit 122. For example, graph 400A illustrates an example output when the device is not being touched, graph 400B illustrates an example where the device is being lightly touched, and graph 400C illustrates an example where the device is being strongly touched. The touch may be, for example, a fingertip touch. A light touch may be when there is less pressure, or force, applied to the device as compared to the pressure, or force, applied by a strong touch.

Each graph 400A, 400B, 400C may include one or more sampling windows 404 and windows 402 when the LRA is receiving the signal. For example, a signal may be output by the microcontroller to the amplifier. The amplifier may transmit the signal to the LRA until the switches are changed to the open position. Windows 402 may be times between when the audio amplifier transmits the signal to the LRA and the time when the switches are changed to the open position. During time "t" between windows 402, one or more samples may be taken of the LRA. The signal from the LRA may be the back EMF.

During time t, the LRA may continue to oscillate. The oscillations of the LRA may produce back EMF. When the device is touched during time t, the oscillations may dampen, or lessen, as the energy of the oscillations may be absorbed by whatever object is touching the device. For example, the human body is a viscoelastic material that is capable of absorbing energy. When a user touches the device, the body of the user may absorb at least some of the energy from the oscillating LRA. This may dampen the oscillation of the LRA which may decrease the back EMF.

Graph 400A illustrates an example where the device is not touched. As shown, the output of the LRA illustrates that the LRA continued to oscillate. The output of the LRA, corresponding to the back EMF, has peaks and valleys that correspond to the oscillation of the LRA.

Graph 400B illustrates an example where the device is being touched with a light touch. The oscillations of the LRA in graph 400B during time t are smaller than those in graph 400A. The decrease in back EMF in graph 400B may be due to the device being touched. For example, the oscillations of the LRA may have been dampened due to the energy of the LRA being absorbed by the user touching the device. A light touch by the user may indicate that only some of the energy of the LRA is absorbed by the user such that there are still some peaks and valleys of back EMF during time t.

Graph 400C illustrates an example where the device is being touched with a strong touch. The oscillations of the LRA in graph 400C during time t are smaller than those in both graphs 400A and 400B. Similar to graph 400B, the decrease in back EMF in graph 400C may be due to the device being touched. A strong touch by the user may indicate the most of the energy of the LRA is absorbed by the user such that there are almost no peaks and valley of back EMF during time t. A strong touch may be a touch that absorbs more energy of the LRA than a light touch. According to some examples, a strong touch may be a touch that has more pressure than a light touch.

To determine the type of contact between the device and its surroundings, the PWM width may be adjusted to produce minimum measurable back EMF peaks when the device is touched. The sampling window 404 may be calibrated to the position of the highest back EMF peak in the output of the back EMF measurement circuit. The value of the back EMF during sampling window 404 may be determined. The determined back EMFs may be stored in the memory of the device. According to some examples, the determined back EMF may be stored in a first-in-first-out ("FIFO") buffer such that only a predetermined number of determined back EMF values are stored. To determine whether the device was touched, the most recent determined back EMF may be compared to a previously determined back EMF value. The previously determined back EMF value may be one of the predetermined number of determined back EMF values stored in the FIFO buffer. If the difference between the most recently determined back EMF value and the previously determined back EMF value is greater than a predetermined threshold, the device was touched. The predetermined threshold may be, for example, 65 mV. According to some examples, the predetermined threshold may be dependent on the device and/or the LRA such that the predetermined threshold may be 42 mV, 57 mv, 71 mV, etc. Thus, the predetermined threshold of 65 mV is merely one example and is not intended to be limiting.

To determine the pressure of contact with the device, the most recent determined back EMF may be compared to a baseline threshold. For example, the difference between the baseline threshold and the most recent determined back EMF may correspond to the pressure of the touch.

Figure 5:
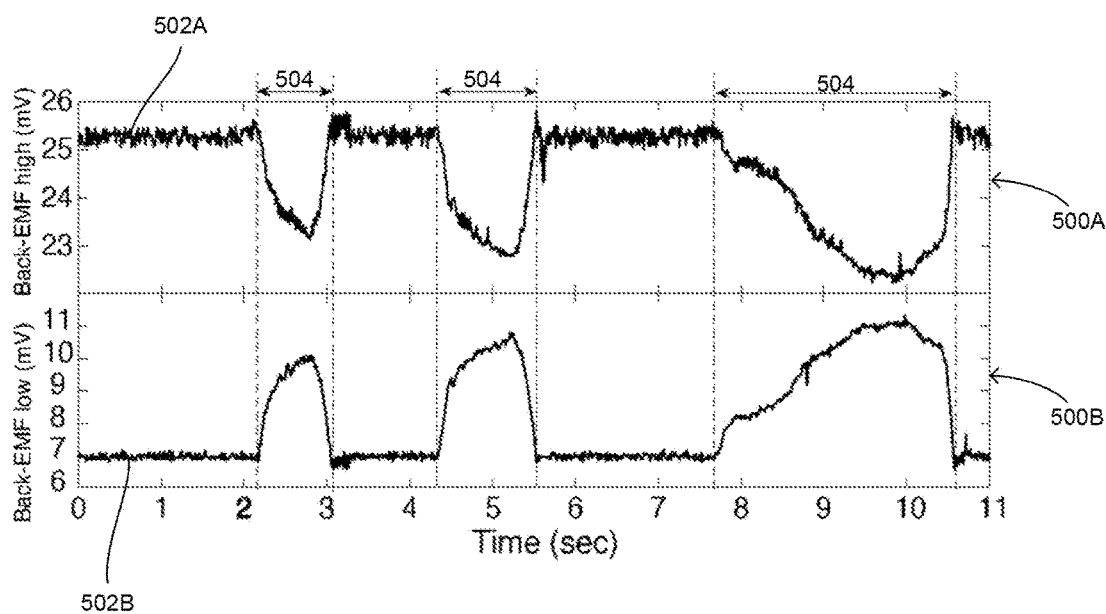
FIG. 5 is another graphical representation of back EMF when a device is being touched in accordance with aspects of the disclosure.

FIG. 5 illustrates an example of mean sampling of low and high cycles over time. For example, graphs 500A and 500B illustrate the output 502A, 502B of the back EMF measurement circuit during low and high cycles while the device is being touched. The device may be touched during time 504. As shown in graphs 500A, 500B, the back EMF may remain constant but for when the device is being touched. As shown in graph 500A, when the device is touched during time 504 the high back EMF decreases. The decrease in high back EMF may be due to at least some of the energy of the LRA being absorbed by the object touching the device. As shown in graph 500B, when the device is touched during time 504 the low back EMF increases.

Figure 6:
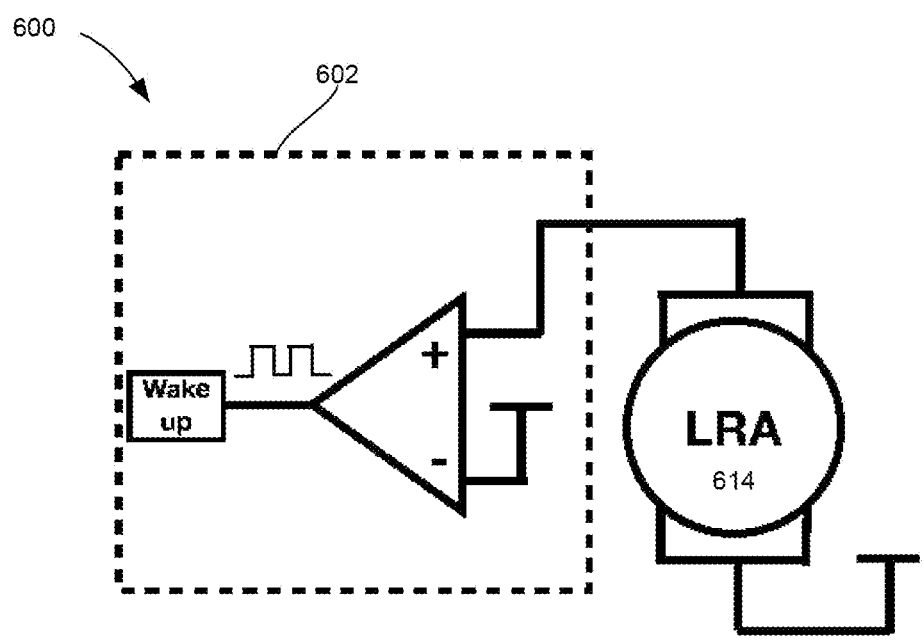
FIG. 6 is a schematic diagram of a sensing circuit in accordance with aspects of the disclosure.

FIG. 6 illustrates an example sensing circuit to determine whether the device has been tapped. For example, tap detection may be monitored at low power and may be used as a wake-up gesture for the device. Tap detection may not use active sensing and, therefore, does not need to actuate the LRA by transmitting a signal. When the device is tapped, the magnet of the LRA may move relative to the coil. Sensing circuit 600 may be used to detect the tap. Sensing circuit may include a comparator 602 coupled to the LRA 614. According to some examples, the comparator 602 may have a threshold of 1.125V. However, the threshold of comparator 602 may be more or less than 1.125V, such as 0.8V, 1.02V, 1.132V, etc. Thus, the threshold of 1.125V is merely one example and is not intended to be limiting.

Comparator 602 may include a microcontroller. The microcontroller may detect interrupts produced by comparator 602 while in sleep mode. For example, microcontroller 602 may detect when the device is tapped based on the back EMF output by the LRA 614.

Figure 7:
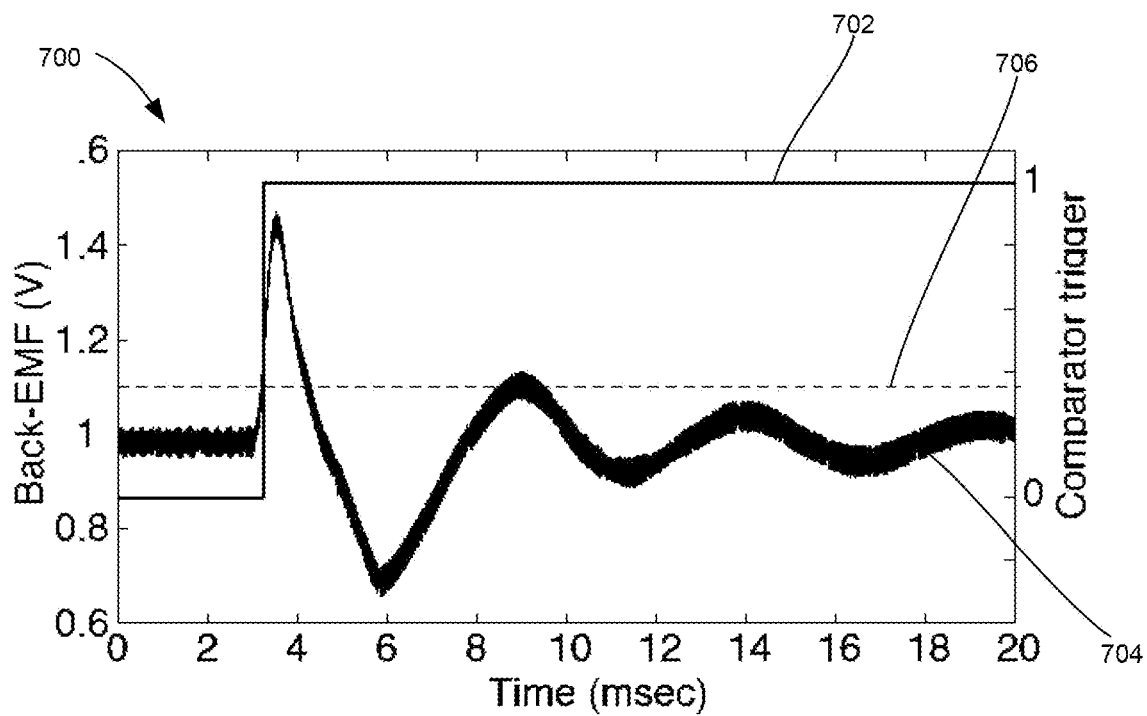
FIG. 7 is an example graphical representation of back EMF produced when tapping a device in accordance with aspects of the disclosure.

FIG. 7 illustrates an example back EMF produced by tapping the device. Graph 700 includes comparator trigger output 702, back EMF output 704, and threshold 706. The back EMF output 704 may correspond to the back EMF output by LRA 614. For example, as the device is tapped, the magnet within the LRA may move relative to the coil. The movement of the magnet relative to the coil may produce a back EMF. The back EMF output 704 may be compared to the threshold 706 to determine whether the device was tapped. The threshold voltage 706 may correspond to the threshold of comparator 702. The comparator trigger output 702 may correspond to an action of the device in response to determining the device was tapped. For example, if it is determined that the device was tapped, the comparator trigger output 702 may indicate that the screen of the device turns on.

According to some examples, the passive LRA sensing, discussed with respect to FIGS. 6 and 7, may be combined together with the active LRA sensing, discussed with respect to FIGS. 1B-5. The passive and active LRA sensing may be combined with one or more switches. In some examples, the passive and active LRA sensing may be implemented separately for power optimization.

The LRA may be used as combined input/output devices in portable electronics. Portable electronics may include mobile and wearable devices. For example, an LRA may be coupled to the portable electronic as a button to provide tap, touch, and pressure sensing. The LRAs may additionally provide haptic feedback once touch is detected.

Figure 8A:
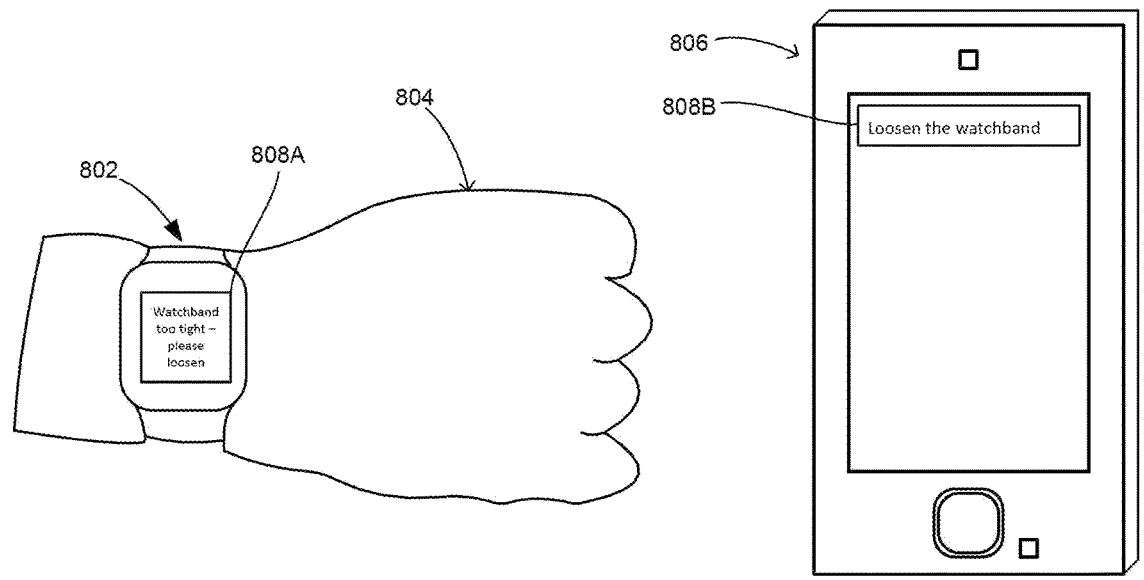
FIGS. 8A and 8B are pictorial diagrams illustrating example uses of the LRA in accordance with aspects of the disclosure.
Figure 8B:
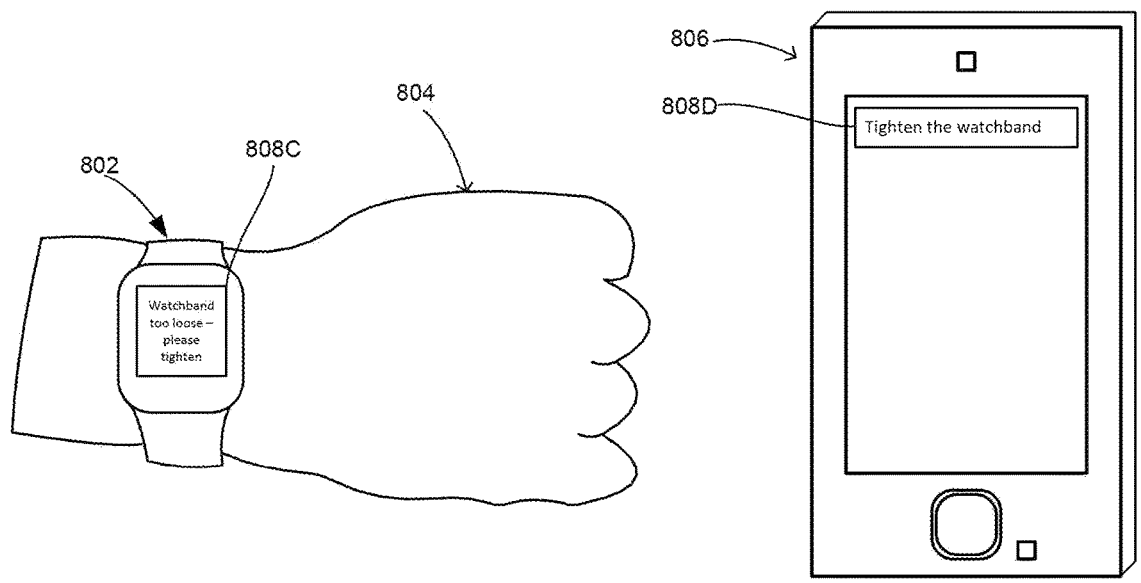

FIGS. 8A and 8B illustrate example feedback based on the coupling of a wearable device to the skin of a user. According to some examples, the wearable device may be a smartwatch. The wearable device may include a short range communications interface that allows the accessory to be coupled to the host device. The wireless coupling may be established using any of a variety of techniques, such as Bluetooth, Bluetooth low energy (BLE), etc. The host device may be, for example, smartphone, a laptop computer, or any of a variety of other host devices, such as gaming systems, tablets, etc.

For the wearable device to provide haptic feedback with consistent force, the wearable device may be coupled to the skin such that the LRA applies constant contact pressure to the skin of the user at a predetermined target pressure. Constant contact pressure may be the pressure between the device and the skin of the user that remains stead for more than a threshold period of time. The LRA may be used to determine an amount of constant contact pressure between the user and the wearable device. For example, the band of the smartwatch may not be too tight or too loose.

As shown in FIG. 8A, if the LRA of smartwatch 802 determines that the constant contact pressure between the user 804 and smartwatch 802 is too tight, smartwatch 802 may provide a notification 808A, 808B to loosen the watchband. The notification 808A, 808B may be provided on the display of smartwatch 802 and/or the display of host device 806.

As shown in FIG. 8B, if the LRA of smartwatch 802 determines that the constant contact pressure between the skin of the user 804 and smartwatch 802 is too loose, smartwatch 802 may provide a notification 808C, 808D to tighten the watchband. The notification 808C, 808D, may be provided on the display of smartwatch 802 and/or the display of host device 806.

In some examples, if the wearable device determines, based on the determined amount of constant contact pressure between the user and the wearable device, that the amount of constant contact pressure is too tight or too loose, the wearable device may adjust the amplitude of the vibrotactile force to compensate for the tightness or looseness. For example, if the determined constant contact pressure is too tight, the amplitude of the vibrotactile force may decrease. In some examples, if the determined constant contact pressure is too loose, the amplitude of the vibrotactile force may increase.

Figure 9A:
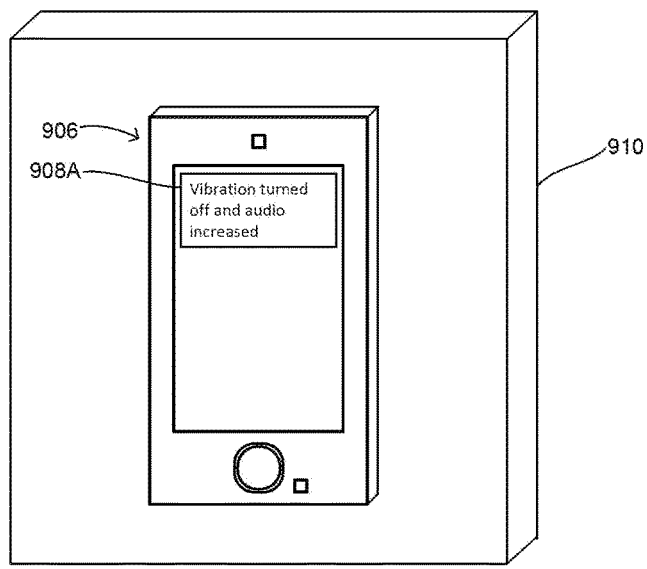
FIGS. 9A-9C are pictorial diagrams illustrating further example uses of the LRA in accordance with aspects of the disclosure.
Figure 9B:
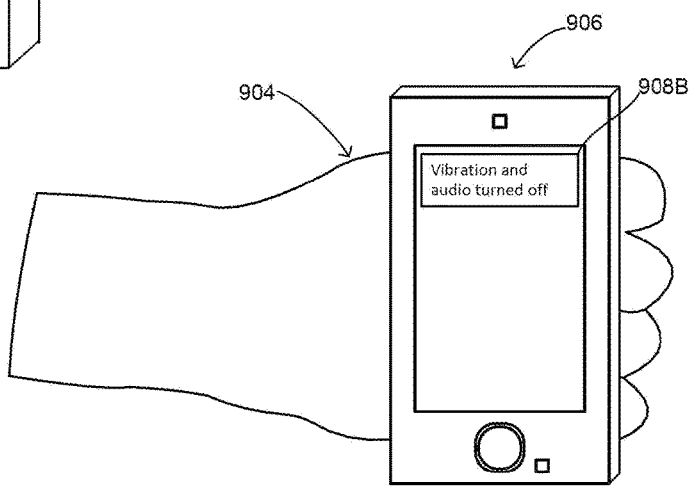
Figure 9C:
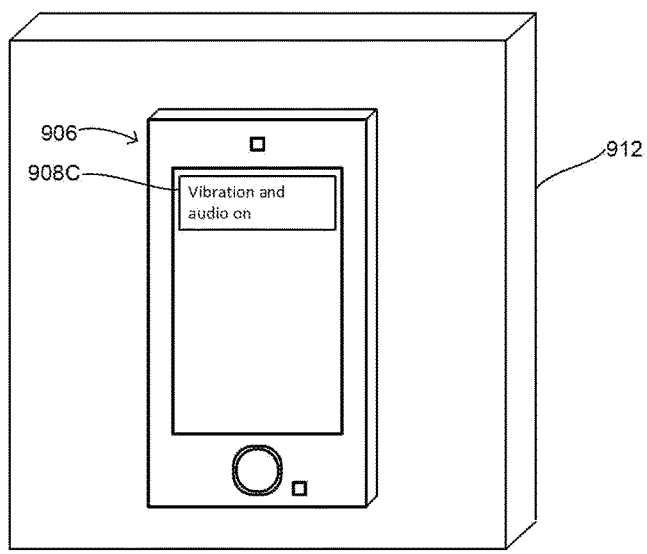

FIGS. 9A-9C illustrate example notifications based on the sensed environment. The LRA on the device may adjust the haptic and/or audio feedback based on the sensed environment. For example, the device may determine that material surface the device is resting on based on how much vibrational energy is dissipated. The vibrational energy may dissipate more or less depending on what surface or object is touching the device. For example, the vibrational energy may dissipate more when the device is being held by a user than when the device is placed on a hard surface, such as a table. In some examples, the determined back EMF may change based on how much vibrational energy is absorbed by the surface. The softer the surface, the more vibrational energy that is absorbed such that the oscillation of the LRA may dampen more. As the oscillation of the LRA is dampened, the amount of back EMF may decrease as compared to when the device is on a hard surface. In examples where the device is on a hard surface, less vibrational energy may be absorbed by the surface such that the oscillation of the LRA dampens less than when the device is on a soft surface. Machine learning models may be used to classify and determine the material surface in contact the device. Based on the material surface in contact with the device, the device may adjust the amplitude of the vibrotactile force. A change in the vibrotactile force may change the intensity of the haptic feedback of the device. For example, if the amplitude of the vibrotactile force is increased, the intensity of the haptic feedback may be increased. If the vibrotactile force is decreased, the intensity of the haptic feedback may be decreased.

As shown in FIG. 9A, the device 906 may be on a soft surface 910, such as foam, a couch, a bed, etc. A soft surface 910 may be a surface that allows for the vibrational energy of the device to dissipate as the soft surface may absorb at least some of the vibrational energy of the device. The device 906 may determine it is on a soft surface 910 based on how much energy is being absorbed by the surface. According to some examples, the device 906 may determine it is on a soft surface 910 based on the determined back EMF. Once the device 906 determines it is on a soft surface 910, the device 906 may provide a notification 908A indicating an adjustment to the vibrotactile force and/or audio output for notifications. For example, haptic feedback may not be felt and/or heard when the device is on a soft surface. According to some example, if the device 906 determines it is on a soft surface, the device 906 may decrease the vibrotactile force and increase the audio output for notifications. A notification 908A may be provided on the device indicating these changes.

As shown in FIG. 9B, the device 906 may be held by a user 904. The human body is a viscoelastic matter that can absorb the vibrational energy of the device. As the user's body absorbs the vibrational energy of the device, the device may determine a back EMF. The device 906 may determine a length of time that the vibrational energy is being absorbed. The length of time that the vibrational energy is being absorbed may indicate that the user tapped, touched, or is holding device 906. For example, a tap may have a duration of zero (0) to 0.5 seconds while a touch may have a duration greater than 0.5 seconds. However, a tap may be greater than 0.5 and a touch may be less 0.5 seconds. Thus, the example ranges provided for a tap and a touch are merely one example and is not intended to be limiting. The device 906 may determine it is being held when the duration is longer than the duration of a touch.

Based on the determined back EMF and the duration of the contact with device 906, the device 906 may determine that it is being held by the user 904. Once the device 906 determines that it is being held by the user 904, the device 906 may provide a notification 908B indicating an adjustment to the vibrotactile force and/or audio output for notifications. For example, haptic and/or audio feedback may not be required for notifications as the user is currently holding the device. In such an example, the device 906 may turn off haptic feedback and audio output for notifications. A notification 908B may be provided on the device indicating these changes.

As shown in FIG. 9C, the device 906 may be on a hard surface 912, such as a wood or glass table. As the hard surface 912 will not absorb the vibrational energy of the device 906, the vibrational energy of the device 906 will not dissipate as it would on the soft surface as described above. The device 906 may determine it is on a hard surface 912 based on how much and/or little of the vibrational energy of the device is absorbed by the surface. After device 906 determines that is it on a hard surface 912, the device 906 may provide a notification 908C indicating an adjustment to the vibrotactile force and/or audio output for notifications. For example, if the device 906 was only set to provide haptic feedback for a notification when the device 906 is put onto a hard surface, the device 906 may adjust the feedback to be both haptic and audio feedback. The notification 908C may indicate that both vibration and audio feedback is turned on.

Figure 10:
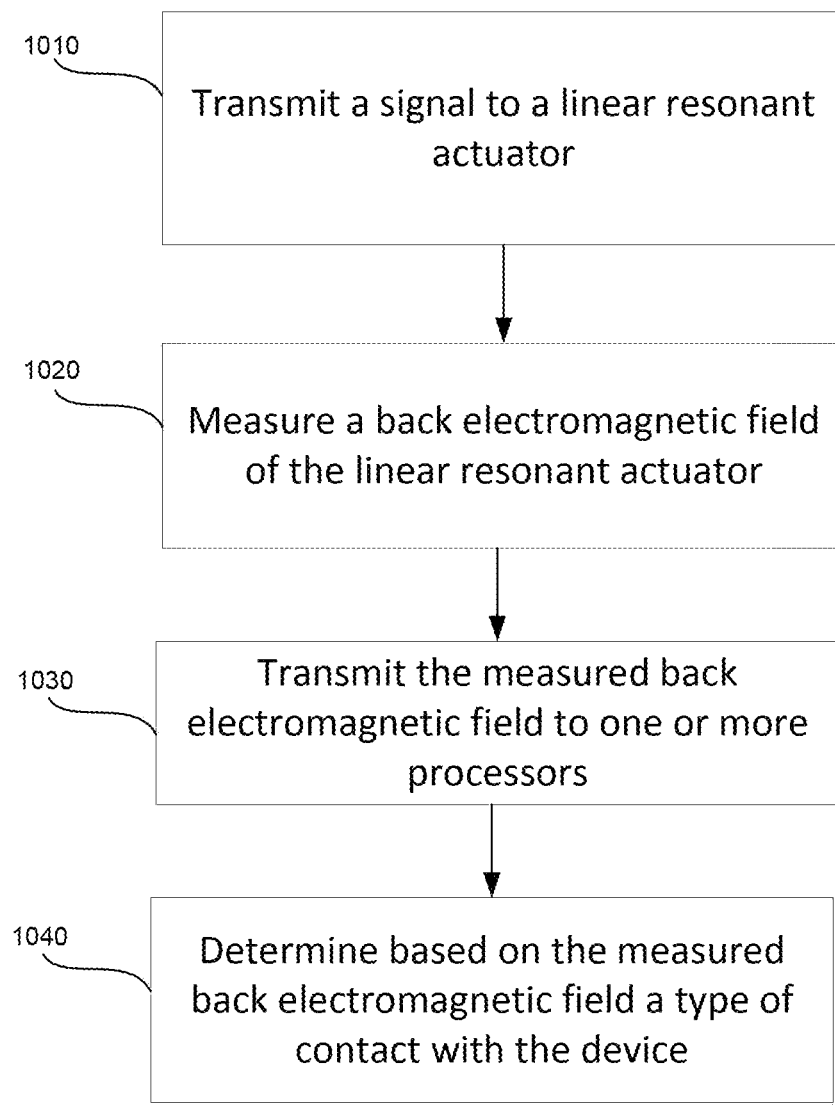
FIG. 10 is a flow diagram illustrating a method of determining a type of contact with a device in accordance with aspects of the disclosure.

FIG. 10 illustrates an example method of determining a type of contact with a device. The following operations do not have to be performed in the precise order described below. Rather, various operations can be handled in a different order or simultaneously, and operations may be added or omitted.

For example, in block 1010 a signal may be transmitted to a LRA by a microcontroller in communication with the LRA. In some examples, the signal may be transmitted to an amplifier by the microcontroller in communication with the LRA and the amplifier. The signal may be a PWM waveform. The PWM waveform may be optimized for sensing. For example, the waveform may have three equal stages including a ramp up stage, a flat stage, and a ramp down stage. Splitting the waveform into equal stages may cause the mass inside the LRA to move more smoothly such that the audible crackling noise may be decreased.

According to some examples, the amplifier may be coupled to the LRA by one or more switches. The one or more switches may be switched, by the microcontroller, from a closed position to an open position or from the open position to the closed position. According to some examples, when the one or more switches are in the open position the signal may not be transmitted from the amplifier to the LRA.

In block 1020, the microcontroller may measure, or determine, a back EMF of the LRA. For example, based on the type of contact with the device, the oscillation of the LRA may dampen. The dampening of the oscillation of the LRA may change the back EMF produced by the LRA. Determining the back EMF produced by the LRA as the oscillation dampens may be used to determine the type of contact made with the device.

According to some examples, the microcontroller may measure the back EMF of the LRA when the one or more switches are in the open position. For example, when the one or more switches are in the open position, the LRA may continue to oscillate. The back EMF may be measured as the LRA continues to oscillate without being driven by a signal. According to some examples, the back EMF may be captured and/or measured using a differential amplifier, such as an instrumentation amplifier.

In block 1030, the microcontroller may transmit, to one or more processors, the measured back EMF.

In block 1040, the one or more processors may determine, based on the measured back EMF, a type of contact with the device. The type of contact may include a user holding the device, the device resting on a material surface, the device being worn by a user, or a touch. The type of contact between the device and its surroundings may be based on at least one of a speed of contact with the device, a pressure of contact with the device, a duration of contact with the device, a material in contact with the device, or a surface area in contact with the device. For example, to determine if the type of contact is a touch, the measured back EMF may be compared to a previously measured back EMF. If the difference between the measured back EMF and the previously measured back EMF is greater than a predetermined threshold, the device may determine that the type of contact is a touch. To determine the pressure of contact with the device, the measured back EMF may be compared to a baseline threshold. The difference between the measured back EMF and the baseline threshold may correspond to the pressure of the contact.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A wearable device, comprising:
   a band configured to secure the device to a skin surface of a user;
   a resonant actuator; and
   one or more processors in communication with the resonant actuator, the one or more processors configured to:
   measure a back electromotive force ("EMF") of the resonant actuator;
   determine, based on the measured back EMF, information representative of a contact pressure between the device and the skin surface of the user, the contact pressure being greater when the band is tighter, the contact pressure being lesser when the band is looser; and
   output, based at least in part on the determined information representative of the contact pressure, a notification relating to a tightness of the band.

2. The wearable device of claim 1, wherein the one or more processors are further configured to compare the determined information representative of the contact pressure with a predetermined target pressure.

3. The wearable device of claim 2, wherein:
   when the determined information representative of the contact pressure is greater than the predetermined target pressure, the notification is a notification to loosen the device, and
   when the determined information representative of the contact pressure is less than the predetermined target pressure, the notification is a notification to tighten the device.

4. The wearable device of claim 1, wherein the resonant actuator is a linear resonant actuator.

5. The wearable device of claim 1, wherein the notification is a notification to tighten or loosen the band.

6. The wearable device of claim 1, wherein the one or more processors are further configured to adjust, based on the determined information representative of the contact pressure, a vibrotactile force.

7. The wearable device of claim 1, wherein the one or more processors are further configured to determine, based on the measured back EMF and at least one of a speed of contact with the wearable device, a pressure of contact with the wearable device, a duration of contact with the wearable device, an elasticity of a material in contact with the wearable device, or a surface area in contact with the wearable device, a type of contact between the wearable device and its surroundings.

8. The wearable device of claim 7, wherein the type of contact includes the user holding the wearable device, the wearable device resting on a material surface, the wearable device being worn by the user, or a touch.

9. A method, comprising:
   measuring, by one or more processors, a back electromotive force ("EMF") of a resonant actuator; and
   determining, by the one or more processors based on the measured back EMF, information representative of a contact pressure between a wearable device and a skin surface of a user, the wearable device including a band configured to secure the wearable device to the skin surface of the user, the contact pressure being greater when the band is tighter, the contact pressure being lesser when the band is looser; and
   output, based at least in part on the determined information representative of the contact pressure, a notification relating to a tightness of the band.

10. The method of claim 9, further comprising comparing, by the one or more processors, the determined information representative of the contact pressure with a predetermined target pressure.

11. The method of claim 10, wherein:
when the determined information representative of the contact pressure is greater than the predetermined target pressure outputting the notification further comprises outputting, by the one or more processors, a notification to loosen the wearable device, and
when the determined information representative of the contact pressure is less than the predetermined target pressure outputting the notification further comprises outputting, by the one or more processors, a notification to tighten the wearable device.

12. The method of claim 9, wherein the resonant actuator is a linear resonant actuator.

13. The method of claim 9, wherein outputting the notification includes outputting, by the one or more processors, a notification to tighten or loosen the band of the wearable device.

14. The method of claim 9, further comprising, adjusting, by the one or more processors based on the determined information representative of the pressure, a vibrotactile force.

15. The method of claim 10, further comprising determining, by the one or more processors based on the measured back EMF and at least one of a speed of contact with the wearable device, a pressure of contact with the wearable device, a duration of contact with the wearable device, an elasticity of a material in contact with the device, or a surface area in contact with the wearable device, a type of contact between the wearable device and its surroundings.

16. The method of claim 15, wherein the type of contact includes the user holding the wearable device, the wearable device resting on a material surface, the wearable device being worn by the user, or a touch.

17. A wearable device, comprising:
a resonant actuator; and
one or more processors in communication with the resonant actuator, the one or more processors configured to:
measure a back electromotive force ("EMF")
determine, based on the measured back EMF, a contact pressure between the wearable device and a skin surface of a user; and
output, based at least in part on the determined contact pressure, a notification to tighten or loosen the wearable device.

18. The wearable device of claim 17, wherein the one or more processors are further configured to compare the determined contact pressure and a predetermined target pressure.

19. The wearable device of claim 18, wherein:
when the determined contact pressure is greater than the predetermined target pressure, the notification is a notification to loosen the wearable device, and
when the determined contact pressure is less than the predetermined target pressure, the notification is a notification to tighten the wearable device.

20. The wearable device of claim 17, wherein the device is a wearable device.

* * * * *